(12) United States Patent
Mann (10) Patent No.: US 8,646,669 B2
(45) Date of Patent: Feb. 11, 2014

(54) CANTILEVERED STORAGE UNIT MOUNT FOR VEHICLES

(75) Inventor: James W. Mann, Elkton, MD (US)

(73) Assignee: Blackbird Dynamics, LLC, Elkton, MD (US)

( * ) Notice: Subject to any disclaimer, the term of this patent is extended or adjusted under 35 U.S.C. 154(b) by 893 days.

(21) Appl. No.: 12/070,197

(22) Filed: Feb. 15, 2008

(65) Prior Publication Data
US 2009/0206624 A1  Aug. 20, 2009

(51) Int. Cl.
*B62J 7/02* (2006.01)
*B62J 9/00* (2006.01)

(52) U.S. Cl.
USPC ............................. 224/419; 224/413; 224/453

(58) Field of Classification Search
USPC ......... 224/433, 413, 419, 453, 450, 566, 519; 296/37.1, 75; 280/291–292
See application file for complete search history.

(56) References Cited

U.S. PATENT DOCUMENTS

| | | | | |
|---|---|---|---|---|
| 1,121,580 A | * | 12/1914 | Burkett et al. | 224/415 |
| 4,081,117 A | * | 3/1978 | Crane | 224/441 |
| 4,096,980 A | * | 6/1978 | Clow | 224/441 |
| 4,176,771 A | * | 12/1979 | Dubroc, Sr. | 224/412 |
| 5,038,983 A | * | 8/1991 | Tomososki | 224/521 |
| 5,207,361 A | * | 5/1993 | Slifka | 224/419 |
| 5,660,311 A | * | 8/1997 | Soltau | 224/483 |
| 5,779,254 A | * | 7/1998 | James et al. | 280/291 |
| 5,826,900 A | * | 10/1998 | Steele | 280/291 |
| 6,053,384 A | | 4/2000 | Bachman | |
| 6,068,075 A | * | 5/2000 | Saiki | 180/219 |
| 6,129,370 A | * | 10/2000 | Hsieh et al. | 280/291 |
| 6,131,427 A | | 10/2000 | Webber | |
| 6,296,271 B1 | * | 10/2001 | Henkel et al. | 280/728.3 |
| 6,305,702 B1 | * | 10/2001 | Alford, II | 280/204 |
| 6,499,378 B1 | * | 12/2002 | Ho | 74/564 |
| 6,719,179 B1 | * | 4/2004 | Webb, Jr. | 224/413 |
| 6,729,515 B2 | * | 5/2004 | Nicosia et al. | 224/413 |
| 6,817,502 B2 | * | 11/2004 | Gilstrap | 224/426 |
| 7,014,258 B2 | * | 3/2006 | Schubring et al. | 296/207 |
| 7,066,365 B2 | * | 6/2006 | Brown | 224/401 |
| 7,464,953 B2 | * | 12/2008 | Schloegel | 280/291 |
| 7,641,212 B1 | * | 1/2010 | Liao et al. | 280/293 |
| 7,686,318 B2 | * | 3/2010 | Kouchi et al. | 280/291 |
| 7,854,460 B2 | * | 12/2010 | Tweet et al. | 296/65.03 |
| 7,870,985 B2 | * | 1/2011 | King et al. | 224/413 |
| 7,931,176 B1 | * | 4/2011 | Wenom, Jr. | 224/413 |
| 2004/0094676 A1 | * | 5/2004 | Cuomo | 248/125.7 |
| 2004/0173654 A1 | * | 9/2004 | McAlister | 224/519 |
| 2005/0121482 A1 | * | 6/2005 | Zickefoose | 224/413 |
| 2005/0150921 A1 | * | 7/2005 | Schneider | 224/413 |
| 2005/0188782 A1 | * | 9/2005 | Khiev | 74/560 |
| 2006/0285286 A1 | * | 12/2006 | Littlejohn | 361/683 |
| 2007/0062327 A1 | | 3/2007 | Kouchi | |

\* cited by examiner

*Primary Examiner* — Nathan J Newhouse
*Assistant Examiner* — John Cogill
(74) *Attorney, Agent, or Firm* — E. Alan Uebler, P.A.

(57) ABSTRACT

Storage unit mounting apparatus removably and lockably attachable to a vehicle is provided. The apparatus includes a single, cantilevered support member removably and irrotationally attachable at its proximal end to the vehicle, the distal end of the support member supporting a receiver having integral mounting means to which the storage unit is attachable. The apparatus is especially suited for vehicles such as motorcycles, all-terrain-vehicles (ATVs), bicycles and the like.

37 Claims, 6 Drawing Sheets

CANTILEVERED STORAGE UNIT MOUNT FOR VEHICLES

BACKGROUND OF THE INVENTION

The present invention relates to apparatus attachable to motorcycles, all-terrain vehicles, bicycles, and the like, on which to mount a storage unit for carrying luggage or the like when traveling on such vehicles.

Devices for affixing storage containers and luggage to motorcycles, which inherently limit available options, currently are many in number and varied in design and capacity. Most date back to the saddlebags used long ago to carry various items and consisting of two bags connected together and being draped over the back end of one's horse and cinched thereto. Several forms of motorcycle "saddlebags" are described in U.S. Pat. No. 6,053,384, discussed more fully below.

Among the multitude of designs for luggage carriers for motorcycles and the like, the luggage usually is available in one of two varieties, hard or soft. Soft luggage is usually made from some form of fabric, frequently ballistic nylon or similar durable and flexible material. This luggage usually mounts to the vehicle with straps, tie downs or other securing devices. It has the benefits of being light and conformable. One drawback in a mounting system that uses a number of straps or tie downs is that installation and removal can be time consuming. The luggage or mounting straps, buckles, etc., frequently contact the vehicle, which can result in damage to the vehicle. Soft luggage also typically uses zippers or the like for closures, making them difficult to securely lock. Similarly, the use of straps and tie downs makes the luggage difficult to affix securely to the vehicle.

Alternatively, hard luggage is usually made of fiberglass, plastic, metal, thick leather or some other rigid material. Hard luggage has a benefit of being more easily designed to ensure waterproofness, and it can be mounted such that it does not contact the vehicle. It is also easier to incorporate secure locking mechanisms for the luggage itself and to lock it to the vehicle. Hard luggage has a drawback of being heavier than soft, and requires a more sophisticated mounting system in order to accommodate the increased weight and the lack of flexibility or conformability inherent in the luggage material. These mounting systems can be quite large, and are typically permanently attached and not easily removed from the vehicle or the luggage.

Among the several issued patents directed to luggage carriers for vehicles, especially motorcycles, exemplary is U.S. Pat. No. 6,053,384. The reference discloses a system for removably mounting a saddle bag on the fender strut of a motorcycle. A mounting assembly includes a front and rear mounting bracket attached to an inboard face of the bag by a rigid backing plate. Two cylindrical spool-like keepers are retrofitted to attach to the existing fender and bag guard mounting points on a fender strut. Existing mounting bolts are replaced with longer replacement bolts. A slot in each bracket is sized to slidably engage the neck and heads of each keeper. The bag and bracket assembly are secured to the keepers by a mounting screw.

A foot peg/lock holder combination for a motorcycle is disclosed in U.S. Pat. No. 6,131,427. The reference describes a multi-purpose foot rest peg having an elongated groove to accommodate a disc rotor brake lock, with a hole to accommodate the cylinder locking apparatus of an existing U-shaped rotor disc lock attached to a motorcycle as a foot rest. This allows the lock to combine with the foot rest peg clevis to create a foot rest/rotor disc lock holder combination for a motorcycle.

More recently, Patent Publication US2007/0062327A1 discloses a passenger footrest structure which includes a footrest support bracket for supporting a passenger footrest and an accessory mount formed therewith for supporting an accessory part other than the footrest. The publication describes passenger foot pegs, employed on a motorcycle for the support of feet of a passenger occupying the passenger's seat behind the driver, as generally rigidly secured to a motorcycle frame structure through respective footrest support brackets. Footrest support brackets are employed on each side of the motorcycle frame structure. Prior art footrest structures are said to be exclusively designed to support the respective feet of the fellow passenger and are not designed for any other purpose than for the support of the fellow passenger's feet. The reference then describes a motorcycle passenger footrest structure capable of accommodating, selectively, one of various motorcycle accessory parts such as a grip bar, a stay for the support of a pannier case, a helmet holder, a rope anchor, and any other component part employed in association with the motorcycle.

This reference discloses and suggests an additional mount to be added to the conventional passenger foot peg bracket of a motorcycle to support the various accessories described therein.

In contrast to the known prior disclosures, the present invention provides an improved mounting system for mounting storage units to vehicles such as motorcycles, ATVs, bicycles, and the like, wherein the mounting system fixedly maintains the spatial orientation between the storage units and the vehicle. The storage units can be removably locked to the vehicle and the storage system and/or the storage units can be quickly and easily removed and/or reinstalled on the vehicle. The storage unit as described and claimed herein is intended to encompass containers and receptacles and other variations for storing and transporting such as straps, nets, clamps, and the like.

SUMMARY OF THE INVENTION

Storage unit mounting apparatus removably attachable to a vehicle is provided. The apparatus includes a single, cantilevered support member removably and irrotationally attachable at its proximal end to the vehicle, the distal end of the support member supporting a receiving member having integral mounting means to which the storage unit is attachable, optionally removably attachable, to the receiving member. The vehicle may be a motor vehicle such as a motorcycle, an all-terrain-vehicle (ATV), or the like, or, alternatively, a bicycle.

First mounting means for removably affixing the single cantilevered support member to the vehicle preferably includes a mounting block removably affixed to the vehicle, to which mounting block the support member is affixed.

The means for removably attaching a receiving member to the support member preferably includes the receiving member having a tube affixed thereto, the tube adapted to removably receive the support member, which may be lockably secured thereto.

The means for attaching a storage container to the receiver preferably includes ordinary nuts and bolts.

The storage unit may be constructed of a soft material such as leather or nylon, or a hard material such as a plastic, for example an ABS plastic, fiberglass, or a metal such as aluminum or steel.

In use with a motorcycle, the support member preferably is removably attachable at its proximal end to the clevis of a conventional passenger foot peg bracket of the motorcycle. In addition, the support member may be lockably attachable to the clevis by a suitable lock having a locking pin, wherein the locking pin anchors the support member and passes through the existing openings in the clevis. The lock may be a key lock or a combination lock. In this preferred embodiment, the proximal end of the support member is rectangular or square in cross-section and fits into the clevis snugly, thereby rendering the support member irrotational.

Mounting the storage unit to the receiver can be by a plurality of bolts, for example, or by an adhesive such as a pressure sensitive adhesive film or a layer of a liquid epoxy adhesive, or by both. Preferably, mounting is by both a plurality of bolts and a suitable adhesive.

In an alternative embodiment, the apparatus attached to a motorcycle includes a cantilevered elongate support member insertable into an opening in and through the receiving member into which the support member is slidably and snugly received. In this configuration, the support member and the opening are both complimentary in cross-section such that, upon insertion of the support member into the opening, the apparatus is rendered irrotational. For an example, the receiving member may be a base plate affixed to a square tube into which the elongate support member having a square cross-section is received, the storage container being attachable to the base plate. The elongate support member and receiving member may be lockable, one to the other and, particularly, the support member and receiving member may be lockable by a lock securable by a locking pin, which pin, upon insertion of the elongate support member into the opening, extends through pre-bored openings in register in the square tube and the support member.

The storage container itself is preferably independently lockable. In one such embodiment, a threaded thumb screw is provided, extensible from the interior of the storage container through a wall of the container, through the receiving member, and extending into a threaded and tapped opening in the elongate support member, threadingly securable thereat, with the container being independently lockable, thereby providing, upon assembly of the entire apparatus, secure storage containment accessible only by unlocking the lockable container.

In a further embodiment, the support member includes a mounting block removably lockable into the clevis of a foot peg bracket of a motorcycle, the support member also being removably and lockably attachable to the receiving member by a second lock and locking pin. The second locking pin can have a generally square cross-section and is snugly insertable into and through square openings in the receiving member and the mounting block. Alignment pins may be included extending from openings in the receiving member into openings in the mounting block, whereby rotation between receiver and block is prevented.

In a still further embodiment, the storage container mounting can be attachable to a vehicle through a swivel mount.

In one embodiment, the support member and the receiving member may be constructed as separate sections and then affixed together to form a composite structure, such as a configuration wherein the separate sections are metal, are preformed and are affixed together by welding, brazing or soldering. Alternatively, the support member and the receiving member may be constructed as a single unitary structure. In these constructions, a plastic such as a fiber reinforced or filled plastic, particularly a fiber reinforced ABS plastic, or a metal such as a molded, machined or cast metal such as aluminum or steel, are preferred materials.

DETAILED DESCRIPTION OF THE INVENTION AND PREFERRED EMBODIMENTS WITH REFERENCE TO THE DRAWINGS

Storage unit mounting apparatus removably and lockably attachable to a vehicle is provided. The apparatus includes a single, cantilevered support member removably and irrotationally attachable at its proximal end to the vehicle, the distal end of the support member supporting a receiver having integral mounting means to which the storage container is attachable. The apparatus is especially suited for vehicles such as motorcycles, all-terrain-vehicles (ATVs), bicycles and the like.

Figure 1:
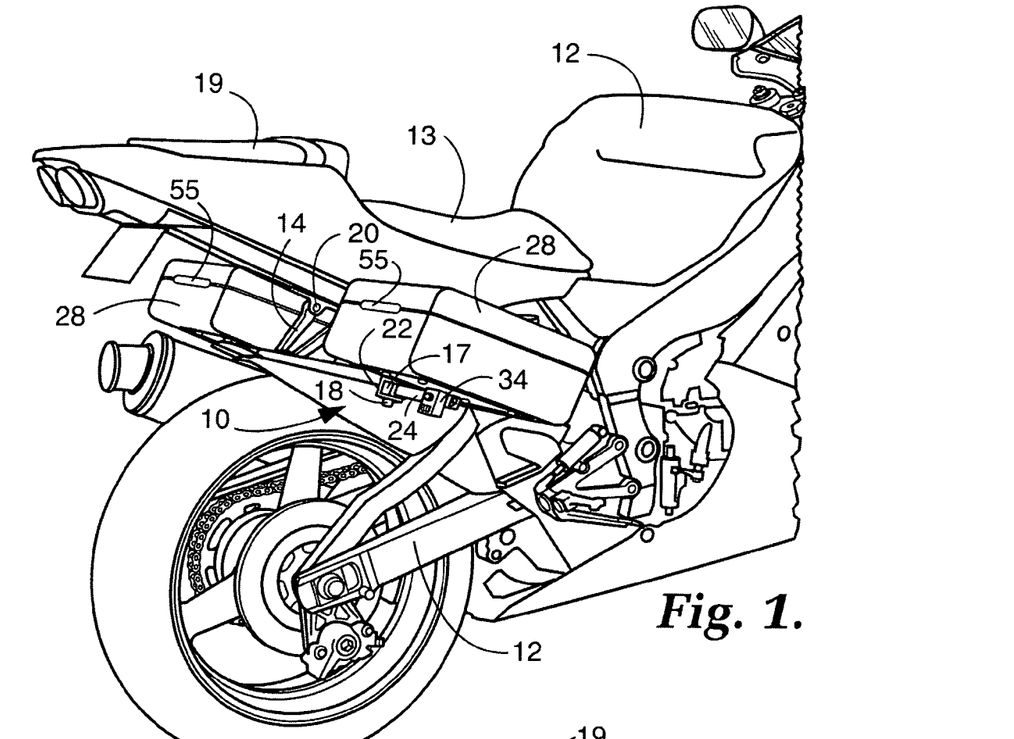
FIG. 1 is a perspective view of a complimentary pair of the assembled mounting apparatus of the invention on which storage containers are respectively affixed, all mounted on foot peg brackets of a motorcycle.

A detailed description of the invention and preferred embodiments is best provided with reference to the accompanying drawings. Therein, FIG. 1 depicts a pair of storage containers 28, one each mounted upon each of the passenger foot peg brackets 14 of a motorcycle 12. Each of the containers 28 is affixed to the motorcycle 12 by the mounting apparatus 10, to be described below in detail. For purposes of illustration, the container mounting apparatus 10 can be affixed to a range of vehicles, such as motorcycles, all-terrain-vehicles (ATVs), bicycles, and the like, and reference will be made here to a motorcycle for ease of illustration. The motorcycle itself and various conventional parts will be referred to herein generally by the reference numeral "12" except where otherwise specifically noted, such as the driver's seat 13, the passenger's seat 19, and the passenger foot peg bracket 14. Component parts of the apparatus 10 shown in FIG. 1 include the storage containers or luggage 28, having lid hinges 55, shown mounted on cantilevered support members 17 affixed, at their proximal ends, to the clevis 22 of the foot peg brackets 14, and held in place by clevis pins 18. The entire container 28 and mounting system 10 is secured to the motorcycle by lock 34.

It will be clear to one skilled in the art that one storage system 10 may be employed, if desired, and affixed to either the right or left side of the cycle 12. A pair is preferred, such as the pair shown in FIG. 1 for illustration.

The storage containers 28, or luggage, may be of any of the usual types, but hard luggage is preferred, which can be constructed of fiberglass, plastic, metal, thick leather, or other rigid material known in the art. The advantage of hard luggage is that it is more easily made waterproof and can incorporate container locks readily as well as mechanisms for locking the container itself to the vehicle.

Figures 2, 3:
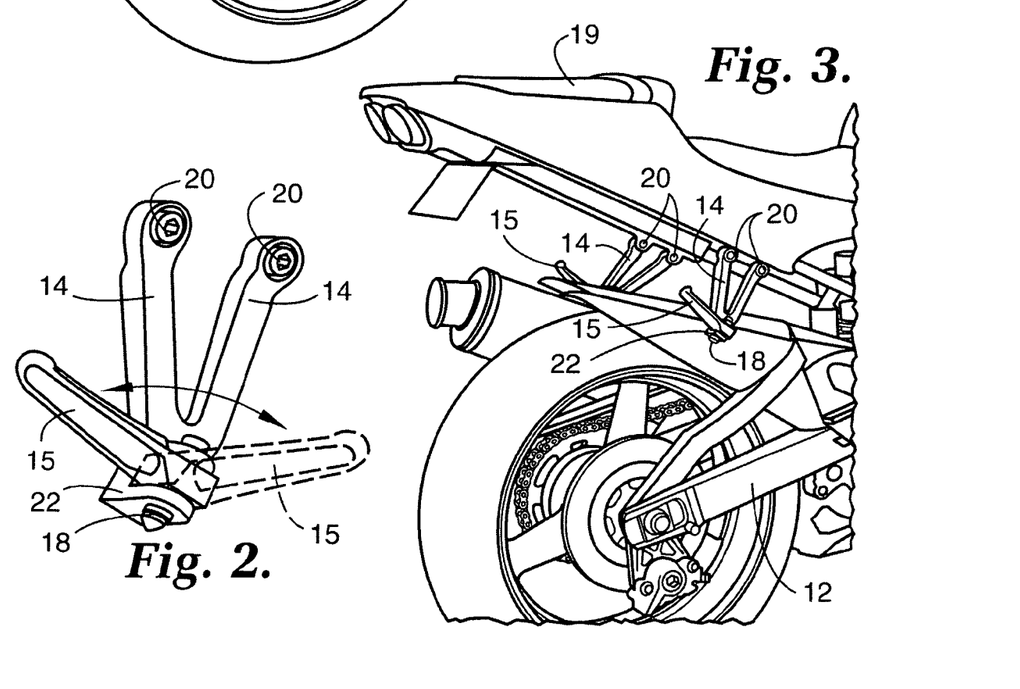
FIG. 2 depicts a conventional foot peg and foot peg bracket for a standard motorcycle, wherein the retracted position of the foot peg is shown and its outwardly extending foot rest position is shown in phantom, the convertability of the mechanism indicated by the double-headed arrow.
FIG. 3 shows a conventional motorcycle on which passenger foot rest pegs are mounted to foot peg brackets, the pegs being in the retracted position in the illustration.

For reference purposes, FIG. 2 shows a conventional passenger foot peg bracket used on a typical motorcycle, including "V"-shaped arms 14, connecting bolts 20 for affixing the bracket to the motorcycle frame 12 (not shown), the arms 14 converging at the clevis 22, in which is secured the foot peg 15 by clevis pin 18. The foot peg 15 is shown in its retracted position, with its operational position, extending outwardly to receive the foot of a passenger, illustrated in phantom, with the double-headed arrow indicating the movement thereof. This foot peg bracket, simply cited hereinafter as bracket 14, provides the connecting point to the motor-cycle 12 for the storage container mounting apparatus 10 of the invention, upon removal of the foot peg 15, which itself can be retained within container 28 for safekeeping.

FIG. 3 shows a further illustration of the conventional passenger foot pegs 15, a pair thereof, one each mounted on either side of motorcycle 12 in the devises 22 of the brackets 14, secured thereat by bolts 20, and positioned below passenger seat 19. In the figure, the foot pegs are shown in the retracted position.

Figure 4:
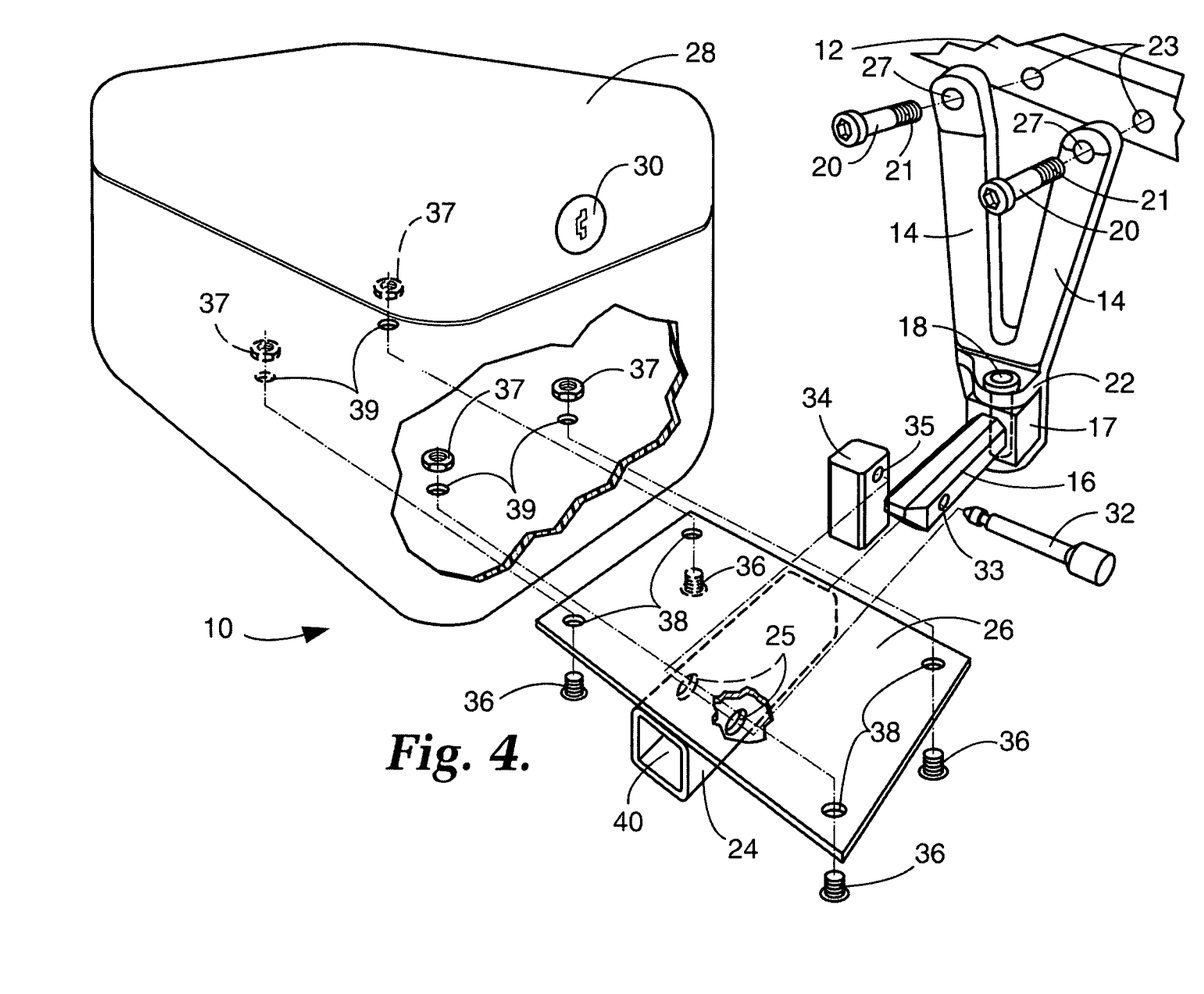
FIGS. 4 and 5 depict exploded views, partially broken away, of alternate, preferred embodiments of the storage unit mounting apparatus according to the invention.

FIG. 4 illustrates a preferred embodiment according to the invention. FIG. 4 is an exploded view, partially broken away, of a luggage container 28 mountable upon mounting plate 26 as shown, by bolts 36 and nuts 37, which plate 26 is attached to square tube 24 having longitudinal opening 40 therethrough. Pre-bored openings 25 in the side walls of tube 24 accept locking pin 32 therethrough, described more fully below. Together the plate 26 and attached tube 24 form the receiving member, or receiver, of the invention, which receives the elongate, cantilevered support member 16 which is affixed to a mounting block 17 inserted into clevis 22 of the foot peg bracket 14 and secured thereat by clevis pin 18.

The elongate member 16 has a cross-section, as shown, which, on insertion into the receiver tube 24, prevents spatial rotation of the mounting apparatus. The cross-section of member 16 may be square and can be chamfered at its leading distal end to allow for ready insertion into opening 40 of the sleeve-like receiver tube 24.

Both the cantilevered support member 16, 17 and the receiver 24, 26 may be constructed of any suitable, strong material, which will be known to the skilled artisan. For example, as discussed above, they may be of a suitable strong plastic such as an ABS plastic, or they may be of a metal, with aluminum being preferred owing to considerations of weight. The components may be fashioned by known techniques such as by molding, casting or machining, all techniques known in the art and selected based on the material chosen for a particular vehicle mount.

The cross-section and other design features of support member 16 are also a matter of designer's choice. They will be chosen specifically to prohibit spatial rotation of the mount, and will include, in addition to substantially square cross-sections, dovetails, T-slotted shafts, and non-circular shafts in general.

In FIG. 4, the cantilevered member 16 has an opening 33 drilled therethrough to accommodate the locking pin 32 and associated lock 34, preferably a key lock, as shown.

Foot peg bracket 14 is affixed to the vehicle 12, depicted as the motorcycle of FIG. 1, by bolts 20 extending through openings 27 and threadingly connected to frame 12 in tapped openings 23 in frame 12 by threads 21, all as shown.

Upon assembly of the apparatus shown, and locking of lock 34 and independent container lock 30, the contents of container 28 are secure. In this arrangement, the container 28 and the attached receiver 24, 26 can be easily detached from the vehicle simply by unlocking lock 34.

The vertical opening in support member 17 for clevis pin 18 is located such that, upon removal of clevis pin 18 the support member 16, 17 may be rotated 90 degrees and clevis pin 18 re-inserted. In this configuration, the support member 16, 17 is positioned such that it no longer protrudes, but is still readily available for use. Furthermore, when the storage container mount is not needed, the support member 16, 17 may be easily removed by opening clevis pin 18, removing the support apparatus and, if desired, replacing the foot peg 15 in the clevis 22 and reinserting the clevis pin 18.

Figure 5:
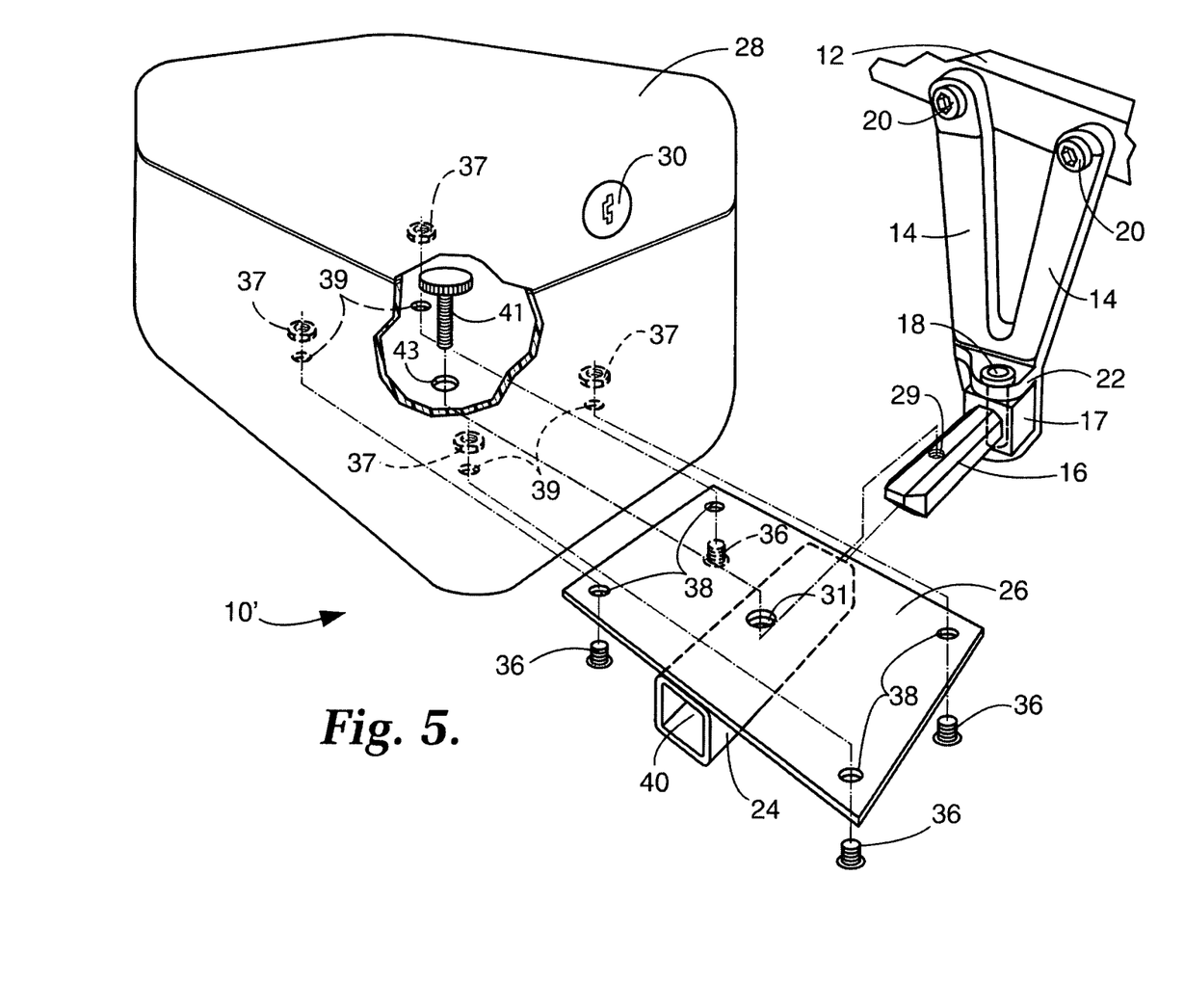

FIG. 5 illustrates a further preferred embodiment of the invention, and is similar in construction to the embodiment shown in FIG. 4. Like components in the two embodiments will be readily apparent to one skilled in the art and their descriptions will not be repeated, reference to the above description of FIG. 4 being incorporated by reference.

An advantage to the system of FIG. 5 is presented by the single lock 30 in the lid of container 28, i.e., when the system is assembled and locked by container lock 30 the entire system is secured.

Referring to FIG. 5, the container 28 is affixed to receiving member 24, 26 which accepts the cantilevered support 16, having mounting block 17, into its opening 40, in turn secured to the foot peg bracket 14 at clevis 22 by pin 18 and mounted to vehicle 12, all in a fashion similar to that of FIG. 4. In this embodiment, a threaded screw means 41, such as the thumb screw 41 shown in the broken away view of FIG. 5, extends through the opening 43 in the bottom wall of container 28, through the pre-bored opening 31 in the top wall of square sleeve 24 and into the drilled and tapped opening 29 in elongate support member 16, openings 29 and 31 being in registry on assembly of the apparatus. In the embodiment shown, on assembly as shown, articles may be placed in container 28 in its open configuration, thumb screw 41 tightened by threaded engagement into opening 29 in support 16, and the entire system locked and secured in place simply by locking the container lock 30. In addition, the container/receiver assembly is easily detached and transportable simply by unscrewing the thumb screw after unlocking and opening container 28.

FIGS. 6-9 depict still further alternate embodiments of the storage container mounting apparatus of the invention. In these descriptions, like components will be described only once, reference to be had to these descriptions in their entireties.

Figures 6, 7, 8:
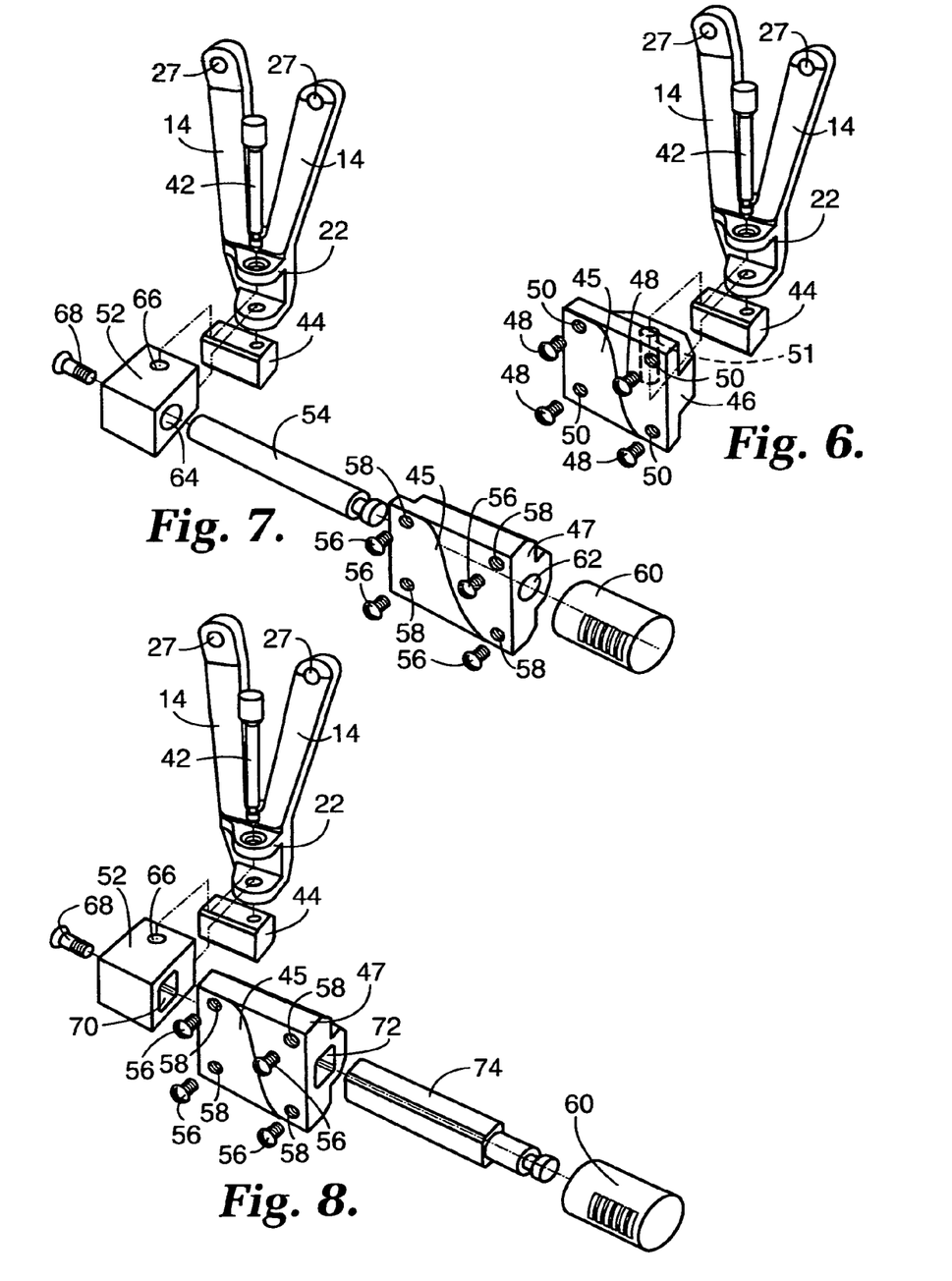
FIGS. 6-9 show further alternate embodiments of the storage container mounting apparatus according to the invention for mounting on the foot peg bracket of a motorcycle.

FIG. 6 depicts an exploded view of the apparatus of the invention in its most general form. Therein is shown the storage unit mounting apparatus wherein the support member and receiving member are constructed as a unitary component structure 46 having a proximal section as shown which is removably and irrotationally attachable within the clevis 22 of the foot peg bracket 14 of a motorcycle. The component 46 is lockably secured thereat by lock 44, preferably a key lock, and lock pin 42, which also serves as a clevis pin passing through opening 51 on support 46 and thereby securing the apparatus to the bracket 14. The cantilevered distal section of member 46 acts as the receiving member which receives, removably, a storage container mounted thereto by bolts 48 affixed within threaded openings 50 in the unitary structure 46. The adhesive layer 45 is also shown in FIG. 6, and this is an optional means for securing the storage container to the receiving end of member 46.

FIG. 7 shows an embodiment of the apparatus which includes an elongate cantilevered support shaft 54 affixed to mounting block 52 having opening 64 therethrough which accepts the cylindrical shaft 54 therein and is secured therein by threaded bolt 68 as shown. The block 52, a rectangular parallelepiped in shape, fits slidingly and snugly into the clevis 22 of foot peg bracket 14 and is lockable therein by lock 44 and lock pin 42, which also acts as the clevis pin, passing through the openings in clevis 22 and opening 66 in block 52. Owing to its rectangular shape, block 52 renders the apparatus irrotational.

The receiving member 47 receives the support shaft 54 through opening 62, the shaft 54 also being a lock pin acting cooperatively with lock 60 to removably lock the apparatus in place. The dual locking system, 44,60, presents alternate and evident locking options for the user. The storage container 28 is affixed to the receiver 47 by bolts 56 secured in threaded openings 58 in the receiver 47, with the optional adhesive layer 45 shown for completeness. This embodiment, in effect, provides a double-cantilevered support apparatus for container 28. The proximal face of the receiver 47 has the vertical indent indicated, which mates with block 52 on assembly, the assembly effectively preventing spatial rotation of the receiver 47.

FIG. 8 depicts a variation on the embodiment of FIG. 7. The support shaft 74 in FIG. 8 has a square cross-section, which is attained by either machining or adding a sleeve, this shaft fitting slidingly and snugly into and through square opening 72 within receiving member 47 and into square opening 70 in mounting block 52, secured thereat by threaded screw 68, the apparatus all being thereby rendered irrotational upon assembly.

Figure 9:
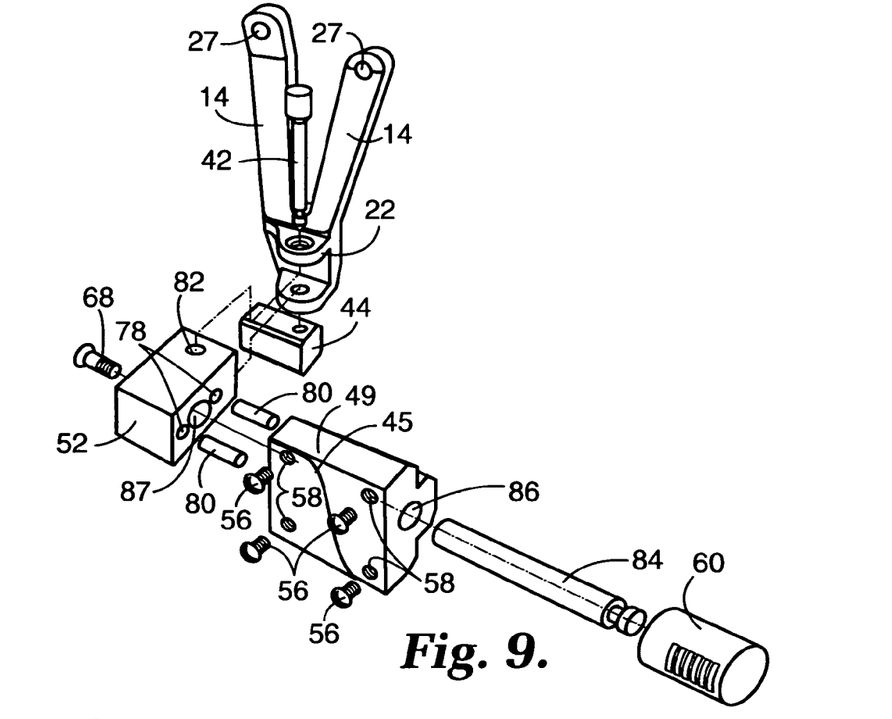

FIG. 9 is a further embodiment similar to that of FIG. 7 wherein alignment pins 80 are embedded into complimentary alignment openings 78 in mounting block 76 which, together with corresponding openings, not seen, in receiver 49, upon assembly, render the apparatus irrotational about the cylindrical support shaft/locking pin 84, which slides through opening 86 in the receiver 49 and into opening 87 in block 52.

Figure 10:
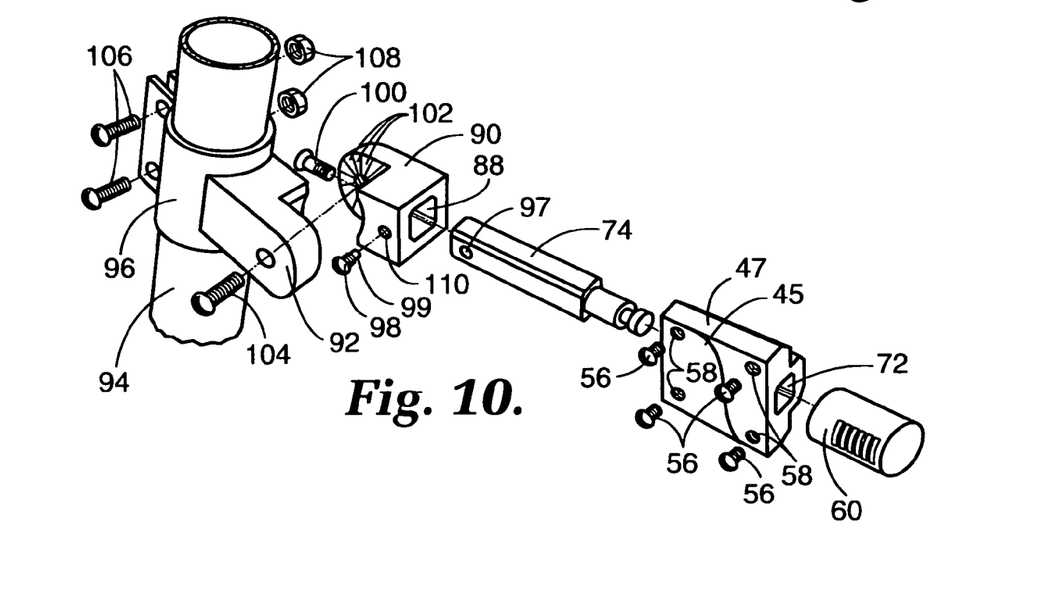
FIG. 10 depicts an exploded view of the storage container mounting apparatus of the invention, including a swivel joint attachable to a rigid strut of a vehicle such as a motorcycle, ATV or bicycle, all according to the invention.

FIG. 10 shows a still further embodiment of the invention which may be affixed to any convenient strut on any vehicle of choice. Therein, the cantilevered support 74 is insertable at its proximal end into square opening 88 in the mounting block 90, and secured thereat by set screw 98, which is partially threaded as shown and partially smooth surfaced, indicated at 99. The screw 98 threadingly engages the threads in opening 110, its smooth end extending into opening 97 in the shaft 74, upon assembly, securing the apparatus thereat. The mounting block 90 forms one-half of a swivel joint with complimentary block 92, adjustable spatially by rotation and seating of grooves 102 and secured by tightening of threaded bolt 104. Shaft 74 is secured by threaded bolt 100. The entire assembly can be affixed, removably and lockably, as desired, to a strut 94 of a vehicle, by "C"-clamp 96 and bolts 106 and nuts 108.

Figure 11:
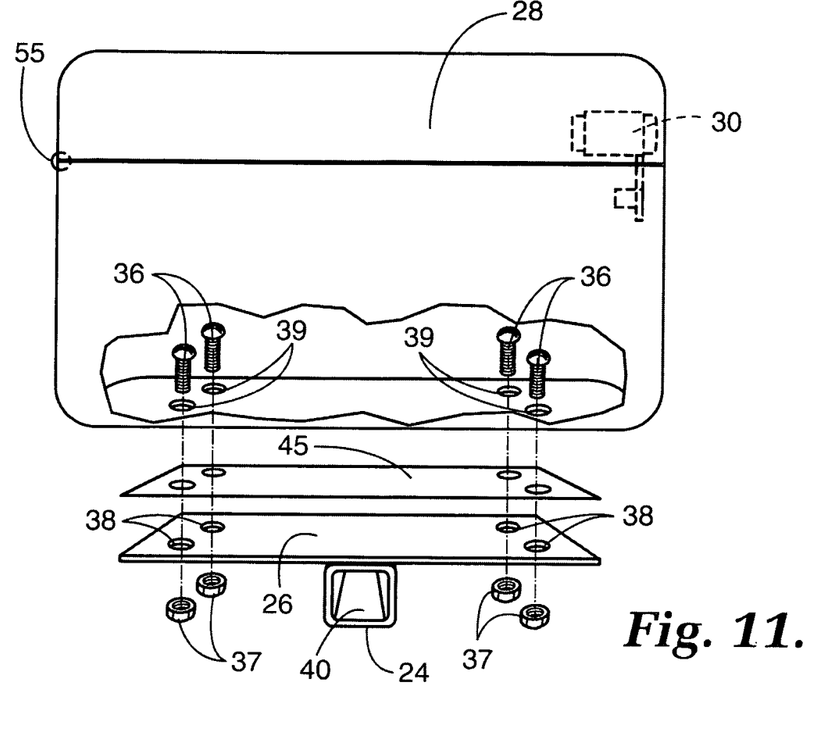
FIG. 11 shows a side elevational, exploded view, partially broken away, of a storage container mounted in a vertical orientation with respect to the mounting apparatus of the invention.

FIG. 11 illustrates, in an exploded, side elevation, partially broken away, a storage container 28 having a lid lock 30 fore and a hinge 55 aft, removably securable to and resting on a receiving member comprising plate 26 affixed to square tube 24, described above, by nuts 37 and bolts 36, as shown, with optional adhesive film 45 shown for completeness. Film 45 may simply be a liquid epoxy applied to plate 28.

Figure 12:
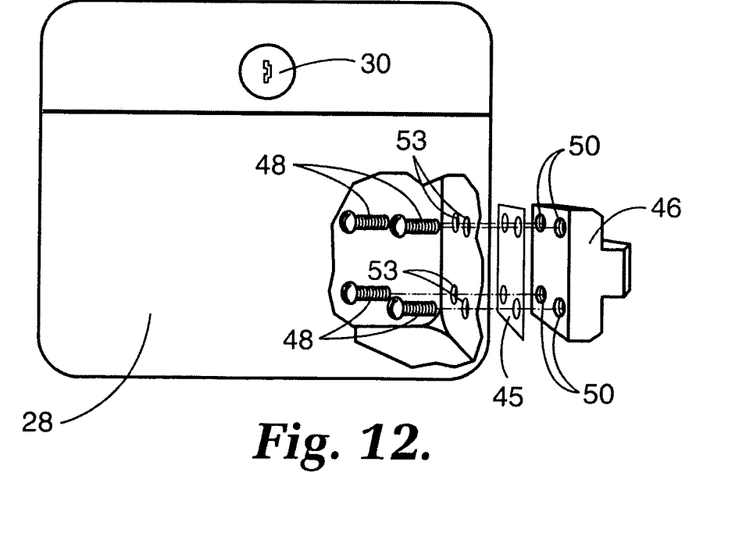
FIG. 12 shows a front elevational, exploded view, partially broken away, of a storage container mounted in a horizontal orientation with respect to the mounting apparatus of the invention.

FIG. 12 shows a front elevation, partially broken away, of a storage container 28 whose side wall is attachable to a unitary cantilevered support/receiver 46 by bolts 48 insertable into threaded openings 50 or, optionally, by adhesive 45.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. Storage unit and mounting apparatus removably attachable to a foot peg bracket of a motorcycle having foot pegs and foot peg brackets, the apparatus comprising:
   (a) a storage unit, and
   (b) a single cantilevered support member removably and irrotationally attachable at its proximal end to a foot peg bracket of said motorcycle, after removal of said foot peg, the distal end of said support member supporting, upon attachment thereto,
   (c) a removable and irrotational receiving member, said receiving member having
   (d) means for attaching said storage unit thereto, wherein said receiving member and said storage unit, upon attachment thereof, are supported and rendered irrotational solely by said single cantilevered support member.

2. The apparatus of claim 1 wherein said cantilevered support member is an elongate member and said receiving member includes an opening into which said support member is slidably and snugly received.

3. The apparatus of claim 2 wherein said support member and said opening are both configured in cross-section such that, upon insertion of the support member into said opening, the apparatus is rendered irrotational.

4. The apparatus of claim 3 wherein said support member is generally square in cross-section and said receiving member comprises a base plate affixed to a square tube into which said support member is received, the storage unit being attachable to said base plate.

5. The apparatus of claim 4 wherein said support member and receiving member are lockable by a lock securable by a locking pin, which pin, upon insertion of said support member into said opening, extends through openings in register in said square tube and said support member.

6. The apparatus of claim 2, including threaded screw means extensible from the interior of said storage unit through a wall of said unit, through said receiving member, and into a threaded and tapped opening in said elongate support member, threadingly securable thereat, said unit being an independently lockable container, thereby providing, upon assembly of said apparatus, secure storage containment accessible only by unlocking said lockable container.

7. The apparatus of claim 6 wherein said threaded screw means is a threaded thumb screw.

8. The apparatus of claim 2 wherein said elongate support member and receiving member are lockable, one to the other.

9. The apparatus of claim 1 wherein said storage unit is constructed of a hard material.

10. The apparatus of claim 9 wherein the storage unit is metal.

11. The apparatus of claim 10 wherein the storage unit is aluminum.

12. The apparatus of claim 9 wherein the storage unit is constructed of plastic.

13. The apparatus of claim 9 wherein the storage unit is fiberglass.

14. The apparatus of claim 1 wherein said support member is removably attachable at its proximal end to a clevis of said passenger foot peg bracket of said motorcycle.

15. The apparatus of claim 14 wherein said support member is lockably attachable to said clevis by a lock.

16. The apparatus of claim 15 wherein said lock is a lock having a locking pin, said locking pin anchored by and passing through openings in said clevis.

17. The apparatus of claim 14 wherein the proximal end of said support member is rectangular in cross-section and fits into said clevis snugly, thereby rendering the support member irrotational.

18. The apparatus of claim 1 wherein said support member and said receiving member are constructed of metal.

19. The apparatus of claim 18 wherein said support member and said receiving member are constructed of steel.

20. The apparatus of claim 19 wherein said support member and said receiving member are constructed of stainless steel.

21. The apparatus of claim 18 wherein said support member and said receiving member are constructed of aluminum.

22. The apparatus of claim 1 wherein said means for attaching said storage unit is an adhesive.

23. The apparatus of claim 22 wherein said adhesive is a pressure sensitive adhesive film.

24. The apparatus of claim 22 wherein said adhesive is a liquid epoxy adhesive.

25. The apparatus of claim 1 wherein said support member is a mounting block removably lockable by a first lock into a clevis of a foot peg bracket of said motorcycle, said support member also being removably and lockably attachable to said receiving member by attachment means comprising a second lock and locking pin.

26. The apparatus of claim 25 including alignment pins extending from openings in said receiving member into openings in said mounting block, whereby rotation between said receiving member and said mounting block is prevented.

27. The apparatus of claim 1 wherein said support member and said receiving member are constructed of plastic.

28. The apparatus of claim 27 wherein said support member and said receiving member are constructed of fiber reinforced ABS plastic.

29. The apparatus of claim 1 wherein said storage unit is removably attachable to said receiving member.

30. The apparatus of claim 29 wherein said means for attaching said storage unit includes a plurality of bolts.

31. The apparatus of claim 1 wherein said storage unit is constructed of a soft material.

32. The apparatus of claim 1 wherein said means for attaching said storage unit includes a plurality of bolts.

33. The apparatus of claim 1 wherein said storage unit is independently lockable.

34. The apparatus of claim 1 attachable to said motorcycle through a swivel mount.

35. The storage unit and mounting apparatus of claim 1 wherein said support member is removably attachable at its proximal end to a clevis of a passenger foot peg bracket of said motorcycle, the support member is an elongate member generally square in cross-section, and said receiving member is a base plate affixed to a square tube into which tube said support member is slidably and snugly received, and wherein said support member and receiving member are lockable, one to the other.

36. The storage unit and mounting apparatus of claim 1 wherein said support member is removably attachable at its proximal end to a clevis of a passenger foot peg bracket of said motorcycle, the support member is an elongate member generally square in cross-section and said receiving member is a base plate affixed to a square tube into which tube said support member is slidably and snugly received, and wherein said storage unit is an independently lockable storage container, the apparatus including threaded screw means extensible from the interior of said storage container through a wall of said container, through said receiving member, and into a threaded and tapped opening in said elongate support member, threadingly securable thereat, thereby providing, upon assembly of said apparatus, secure storage containment accessible only by unlocking said lockable container.

37. The apparatus of claim 1 wherein said cantilevered support member is an elongate cantilevered support member.

* * * * *